(12) United States Patent
Vanderhelm et al.

(10) Patent No.: US 6,968,171 B2
(45) Date of Patent: Nov. 22, 2005

(54) ADAPTIVE NOISE REDUCTION SYSTEM FOR A WIRELESS RECEIVER

(75) Inventors: Ronald John Vanderhelm, Surrey (CA); Wenkai Zhong, Burnaby (CA); Peter R. H. McConnell, Vancouver (CA)

(73) Assignee: Sierra Wireless, Inc., Richmond (*) Notice: Subject to any disclaimer, the term of this patent is extended or adjusted under 35 U.S.C. 154(b) by 444 days.

(21) Appl. No.: 10/163,036

(22) Filed: Jun. 4, 2002

(65) Prior Publication Data

US 2003/0224751 A1 Dec. 4, 2003

(51) Int. Cl.$^7$ ................................................ H04B 1/10
(52) U.S. Cl. ....................... 455/296; 455/303; 455/304; 455/312; 455/278.1; 455/63.1
(58) Field of Search ................................. 455/296–312, 455/295, 269–278.1, 280, 283, 284, 67.13, 63.1, 132, 136, 138, 139

(56) References Cited

U.S. PATENT DOCUMENTS

| | | | | |
|---|---|---|---|---|
| 4,320,535 A | * | 3/1982 | Brady et al. | 455/278.1 |
| 4,384,366 A | * | 5/1983 | Kaitsuka | 455/278.1 |
| 4,736,455 A | * | 4/1988 | Matsue et al. | 455/138 |
| 4,893,350 A | * | 1/1990 | Minamisono et al. | 455/278.1 |
| 5,046,133 A | * | 9/1991 | Watanabe et al. | 455/138 |
| 5,125,108 A | | 6/1992 | Talwar | |
| 5,349,609 A | * | 9/1994 | Tsujimoto | 375/347 |
| 5,440,308 A | * | 8/1995 | Dybdal et al. | 342/17 |
| 5,574,979 A | * | 11/1996 | West | 455/63.1 |
| 5,818,517 A | | 10/1998 | Hudson et al. | |
| 6,175,860 B1 | * | 1/2001 | Gaucher | 709/208 |

FOREIGN PATENT DOCUMENTS

| | | |
|---|---|---|
| EP | 0 680 154 A3 | 7/1966 |
| EP | 289 617 A1 | 5/1988 |

* cited by examiner

*Primary Examiner*—Duc M. Nguyen
(74) *Attorney, Agent, or Firm*—Thelen Reid & Priest, LLP

(57) ABSTRACT

A receiver with reduced near field noise is described. The receiver has a far range receiving section configured to sense a desired signal that includes near field noise. The receiver further includes a near range receiving section configured to sense a near field noise reference signal. An adaptive noise canceller (ANC) of the receiver is configured to detect the magnitude of an error vector from the far range receiving section. The ANC is configured to adjust the phase and gain of the near field noise reference signal in response to the magnitude of the error. Accordingly, the ANC can generate a corrected near field noise reference signal that is added to the desired signal with an adder. The near field noise is canceled by the addition of the corrected near field noise signal. The ANC uses a least mean square technique to determine the amount of correction needed.

29 Claims, 15 Drawing Sheets

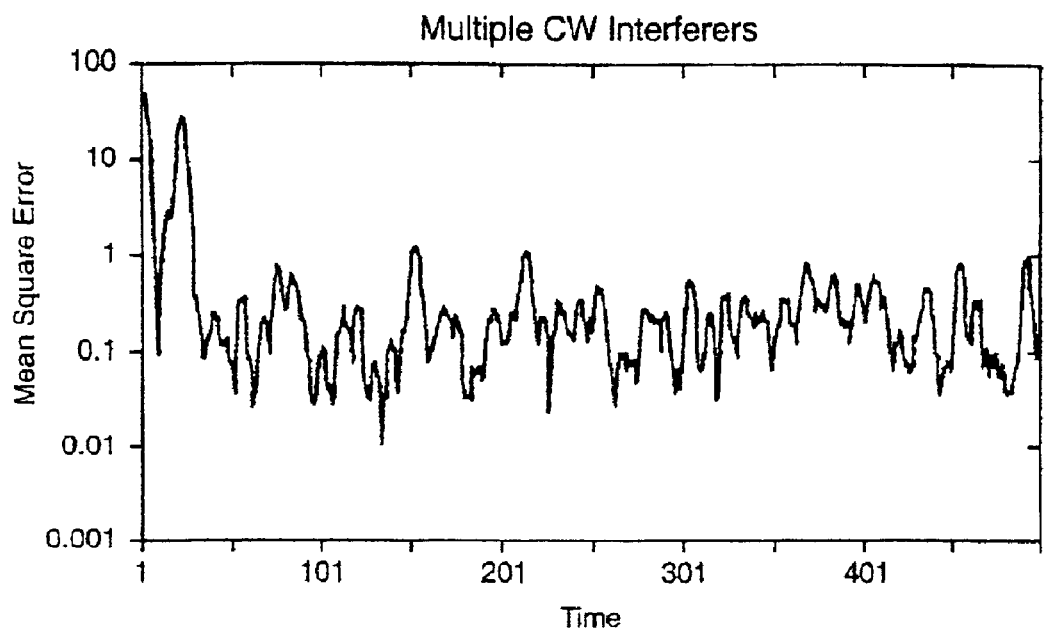
FIG._14
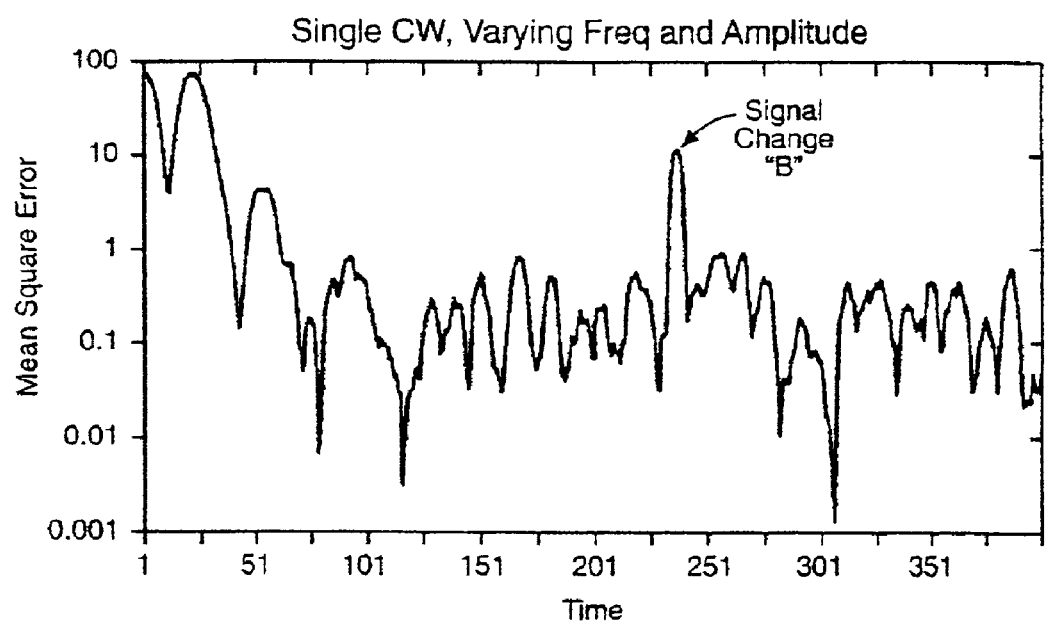
FIG._15

ADAPTIVE NOISE REDUCTION SYSTEM FOR A WIRELESS RECEIVER

BACKGROUND OF THE INVENTION

1. Field of Invention

The present invention relates generally to noise cancellation systems and more particularly to an adaptive noise cancellation system capable of reducing received noise.

2. Status of the Prior Art

Considerable radio noise is generated by Personal Computers (PC's), as well as other portable computing devices. The noise created by these devices can interfere with the reception of signals by devices such as Wireless Wide Area Network Adapters thereby reducing the sensitivity of the adapter and hence the range to the base station.

The interference can be reduced by suppressing the noise at the source through improved design of the noise emitting electronic device. Alternatively, the noise can be reduced by choosing an antenna for the receiving device which isolates the antenna from the computer using distance (i.e., remote cable connection) or other means. However, these solutions have not been effective because of the reluctance of device manufacturers to increase product cost and a user's reluctance to use a remote cabled antenna.

A common problem with both PCMCIA and OEM wireless modules is that host generated noise can cause desense of the modem on one or more channels of the wireless data service. Desense refers to host generated Electro-Magnetic Interference (EMI) increasing the effective level of the noise floor and reducing the effective sensitivity of the receiver. Measurements have shown that desense in the laptop environment for the PCS band can be as high as 19 dB and for the 850 MHZ band can be as high as 30 dB.

The desense typically arises from digital clock noise generated by the computing device. The clock noise creates harmonics and other spectral components which lie within the bandwidth of the radio channel being used. If these spectral emissions occur within the channel being used for data communication, then problems of interference can occur. The emissions are strong enough to significantly degrade the input sensitivity of the receiver, even though their strength is low enough to meet regulatory emission requirements.

Most common current paths within an electronic device (such as a personal computer) consist of I/O cables, printed circuit board (PCB) signal traces, power supply cables, and power-to-ground loops. Each of these current paths can function as an antenna which radiates electric and magnetic fields. Interaction of these fields with other signals is EMI. The magnitude of the EMI is a function of several characteristics of the transmitted signal—such as frequency, duty cycle, and voltage swing (i.e., amplitude). Determining the role of transmitted signal characteristics is best analyzed in the frequency domain using a Fourier transformation. Any periodic function in the time domain f(t), may be represented by an infinite series of sines and cosines:

$$f(t)=A_0+A_1\cos(\omega t)+A_2\cos(2\omega t)+\ldots+A_n\cos(n\omega t)B_1\sin(0 t)+B_2\sin(2\omega t)+\ldots+B_n\sin(n\omega t) \quad (1)$$

where $$\omega=2\pi/T \quad (2)$$

and $$T=1/\text{frequency}. \quad (3)$$

The magnitude of the coefficients $A_n$ and $B_n$ are determined from the duty cycle, edge rate, and magnitude of the digital signal.

If the signal is non-periodic (such as hardware with a microcontroller which references RAM, Flash, I/O devices, control lines, etc. in a time varying fashion), the Fourier Series representation of f(t) (i.e., Equation 1) would contain terms for a wide range of fundamental components such as fundamental frequencies and all of their harmonics.

In a typical PCMCIA or OEM installation, the signal spectrum near the logic boards would appear to be fairly wideband in nature and comprise a large number of individual spectral peaks whose amplitude would vary in time with the function being performed by the digital logic of the board. FIGS. 1 and 2 illustrate representative examples of time domain and frequency domain waveforms.

The frequency spectrum generated by the high clock speeds and sharp edges of clocks in modern digital devices can extend well into the GigaHertz region. As such, these signals may be within the allocated bandwidth of commercial communication services. As previously mentioned, these signals may be relatively low in amplitude to satisfy the requirements of regulatory emission levels. However, these signals are quite strong when compared to the Received Signal Strength Indication (RSSI) of wireless network transmissions. For example, the RSSI from a base station may be in the order of about −85 dBm, but the level of interference from nearby digitally generated noise may be in the order of −80 dBm. As is evident, a −5 dBm signal to noise ratio results in this example and would degrade the overall wireless network performance.

The present invention addresses the above-described interference problems associated with electronic devices by providing a system and method of adaptive noise cancellation. In this respect, the present invention provides a system which can adaptively cancel electronic device generated noise from nearby radiating electronic devices.

BRIEF SUMMARY OF THE INVENTION

In accordance with the present invention, there is provided a receiver with reduced near field noise having a far range receiving section that is configured to sense a desired signal having near field noise. The receiver further includes a near range receiving section configured to sense a near field noise reference signal. An adaptive noise canceller (ANC) of the receiver is configured to detect the magnitude of an error vector from the far range receiving section and adjust the phase and gain of the near field noise reference signal in response thereto. Accordingly, the ANC is configured to generate a corrected near field noise reference signal that is added to the desired signal with an adder. The near field noise is canceled by the addition of the corrected near field noise signal. The ANC uses a least mean square technique to determine the amount of correction needed.

The far range receiving section includes a far range antenna, a far range bandpass filter and a far range amplifier which are operative to sense the desired far field signal having near field noise. Similarly, the near range receiving section includes a near range antenna, a near range bandpass filter and a near range amplifier which are operative to sense the near field noise reference signal. In order to generate the corrected near field reference signal, the receiver further includes a phase corrector electrically connected to the ANC and operative to correct the phase of the near field noise reference signal in response to the magnitude of the error vector. Furthermore, the receiver includes a gain corrector electrically connected to the ANC and operative to correct the gain of the near field reference signal.

In accordance with the present invention, the receiver may further include a demodulator electrically connected to the ANC and operative to demodulate the signal therefrom. In order to further process the signal from the far field antenna, the receiver may further include an in-phase path and a quadrature phase path. The in-phase path has a mixer operative to mix the signal from the far field bandpass filter with a local oscillator signal that has been phase shifted by ninety degrees. The in-phase path further includes a low pass filter electrically connected between the mixer and a digital to analog converter (DAC). The low pass filter and the DAC are operative to produce a digital representation of the received signal before processing by the ANC. Similarly, the quadrature phase path includes a mixer to mix the signal from the far range bandpass filter with a local oscillator signal. The signal from the mixer in the quadrature phase path is then passed through another low pass filter and another DAC before being inputted into the ANC.

In accordance with the present invention, it is also possible to correct the phase and gain of the near field noise reference signal using a tap delay line (TDL) which receives compensation coefficient signals from the ANC. Specifically, the ANC generates a gain compensation coefficient signal and a phase compensation coefficient signal in response to the magnitude of the error from the far range receiving section. The gain compensation coefficient signal is mixed with the near field noise reference signal to generate a gain compensated near field noise reference signal. The phase compensation coefficient signal is mixed with the near field noise reference signal to generate a phase compensated near field noise reference signal. Next, the gain compensated near field noise reference signal and the phase compensated near field noise reference signal are added together to generate the corrected near field noise reference signal.

In accordance with the present invention, there is provided a method for reducing near field noise in a desired signal. The method commences by sensing the desired signal having near field noise. Next, a near field noise reference signal is sensed. A compensation signal is then generated with an adaptive noise canceller by detecting the magnitude of an error vector from the far range receiving section. The phase and gain of the near field noise reference signal is then adjusted with the compensation signal in order to generate a corrected near field noise reference signal. Finally, the corrected near field noise reference signal is added to desired signal in order to cancel the near field noise.

BRIEF DESCRIPTION OF THE DRAWINGS

These, as well as other features of the present invention, will become more apparent upon reference to the drawings wherein:

FIG. 14 is a waveform diagram showing the mean square error converging for multiple interferers;

FIG. 15 is a waveform diagram showing the mean square error converging for a signal with time-varying interferers;

DETAILED DESCRIPTION OF THE PREFERRED EMBODIMENT

Figure 2:
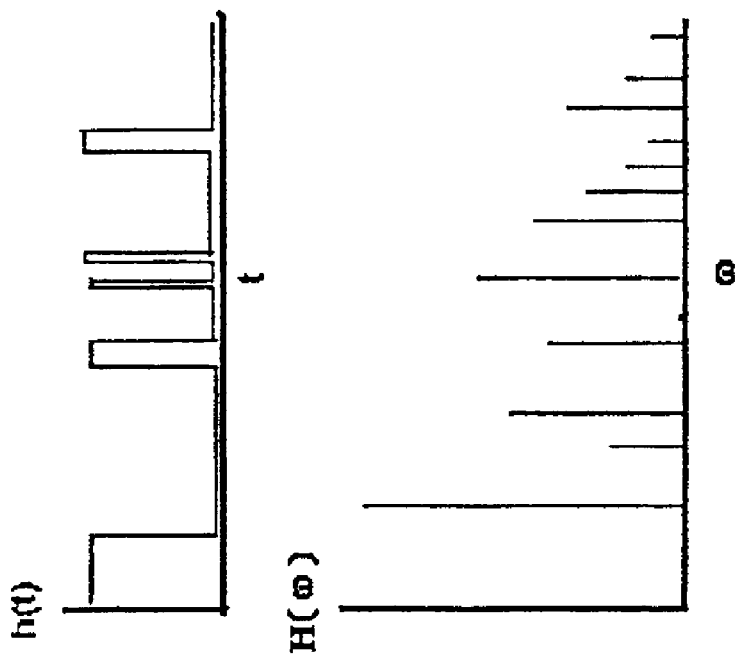
FIGS. 1 and 2 are time domain and frequency domain waveforms for an example of clock noise.
Figure 1:
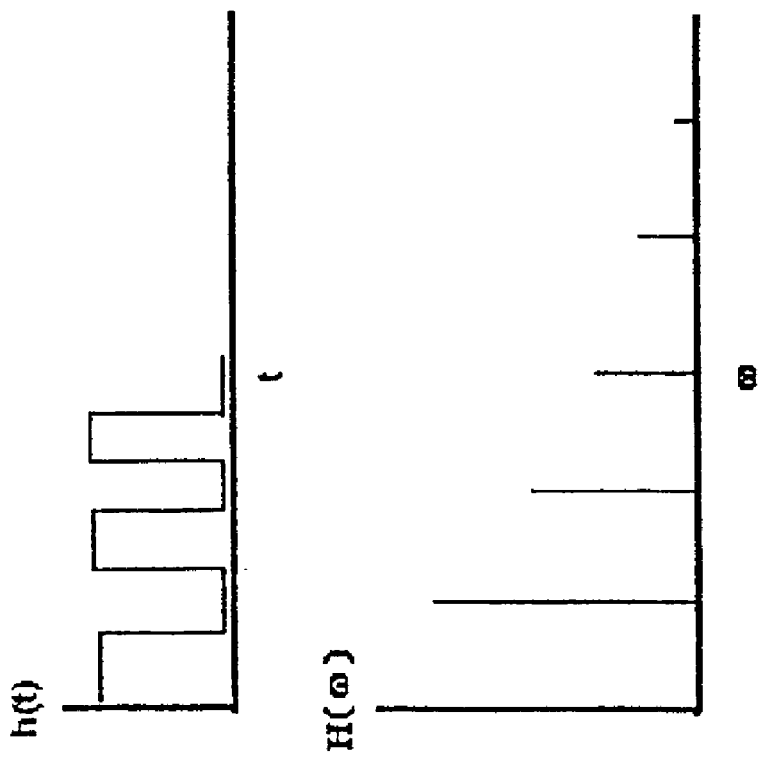
Figure 3:
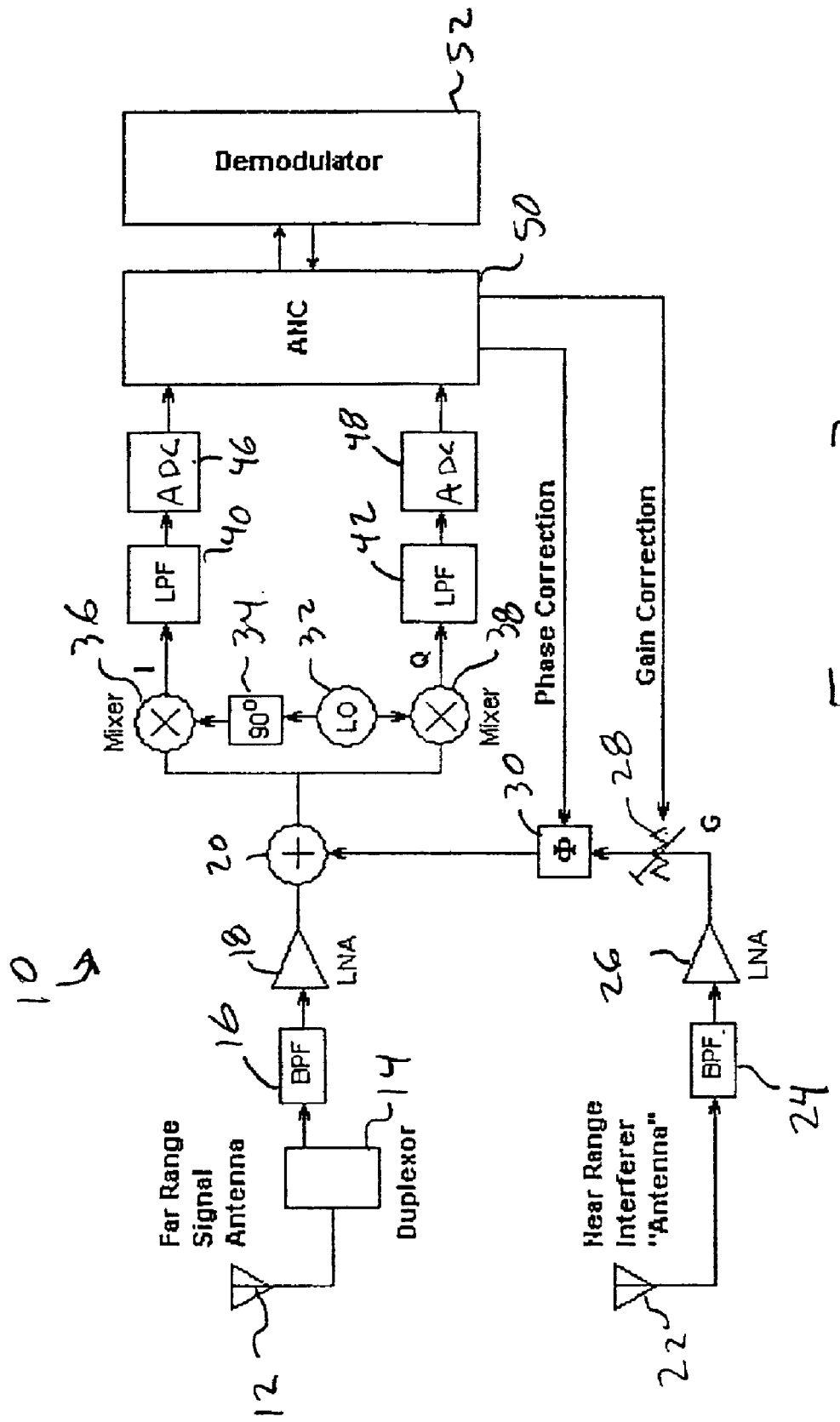
FIG. 3 is block level diagram of a noise cancelling receiver constructed in accordance with a first embodiment of the present invention.

Referring now to the drawings wherein the showings are for purposes of illustrating a preferred embodiment of the present invention only, and not for purposes of limiting the same, FIG. 3 illustrates a first embodiment of a direct conversion receiver 10 having adaptive noise cancellation. The receiver 10 has a far range signal antenna 12 for sensing a desired signal and associated noise. The noise is from the near field and generated by the host electronic device of the receiver 10. The far range signal antenna 12 is connected to a duplexor 14 which allows the signal antenna 12 to be used for both transmitting and receiving a signal. For simplicity, only a receiver portion for the receiver 10 is shown in FIG. 3. However, it will be recognized that the receiver 10 may include a transmit portion that is part of a receiver 10 such that the antenna 12 is can be used to transmit signals as well.

Connected to the duplexor 14 is a bandpass filter (BPF) 16 with a pass band for the desired frequencies to be received. The output of the bandpass filter 16 is fed into a low noise amplifier (LNA) 18 which amplifies the received signal. The output of the LNA 18 is fed to an adder 20 which adds the signal detected by the signal antenna 12 with a noise cancellation signal, as will be described in greater detail below. The far range signal antenna 12, BPF 16, and LNA 18 form a far range receiving section of the receiver 10.

The receiver 10 further includes a local oscillator (LO) 32 which generates a local oscillator signal from a phase lock loop (PLL) (not shown). The phase of the LO signal from the LO 32 is shifted ninety degrees by phase shifter 34. The phase shifted LO signal is then mixed with the signal from the adder 20 with mixer 36 in an in-phase (I) path of the receiver. The output of the mixer 36 is inputted into a low pass filter (LPF) 40 which passes the desired low frequencies of the mixed signal. The output of the LPF 40 is inputted into an analog to digital converter (ADC) 46 which produces a digital representation of the signal. After the signal has been converted into a digital representation, the signal is inputted into an adaptive noise canceller 50.

The signal from the adder 20 is also processed through a quadrature phase (Q) path of the receiver 10. Specifically, the output of the adder 20 is inputted into mixer 38 which mixes the signal with the LO signal from the LO 32. The output of the mixer 38 is passed through LPF 42 and then ADC 48. The digital representation of the signal (in the quadrature phase path) from the ADC 48 is then inputted into the ANC 50. The output of the ANC 50 is inputted into a demodulator 52 for signal conversion.

The ANC 50 is able to measure the magnitude of the error vector for the complex baseband signal from the quadrature and in-phase paths. Then the ANC 50 can adjust the gain and phase of a noise canceller loop to minimize the effects of any error. Specifically, the receiver 10 has a near range interferer antenna 22 which detects any near range interference caused by radiating EMI from the electronic host device. The interferer antenna 22 can therefore obtain a near field noise reference signal which is passed through BPF 24 and LNA 26. The interferer antenna 22, BPF 24 and LNA 26 form a far range receiving section of the antenna 10. Next, the gain of the noise reference signal is adjusted according to a compensation signal generated by the ANC 50.

Specifically, the output of the LNA 26 is inputted into gain corrector 28 which adjusts the gain of the noise reference signal in response to a gain compensation signal generated by the ANC 50. After passing through the gain corrector 28, the phase of the noise reference signal is adjusted by a phase corrector 30 in response to a phase compensation signal generated by the ANC 50. The output of the phase corrector 30 is then inputted into the adder 20 such that the corrected noise reference signal is added to the received signal to minimize interference.

If s(t) represents the desired signal from the signal antenna 12 and $n_1(t)$ represents the undesired noise also received from an interferer at antenna 12, then the receiver path signal is:

$$h(t) = s(t) + n_1(t) \quad (4)$$

The interference loop path should ideally receive the undesired noise only and will be scaled and phase shifted due to the BPF 24, LNA 26 and the physical separation between signal antenna 12 and interferer antenna 22. The signal at interferer antenna 22 is:

$$n_2(t) = a * n_1(t-\tau) \quad (5)$$

At the adder 20, the desired signal is added with the scaled and phase shifted noise reference signal to result in:

$$G(t) = h(t) + n_2(t) \quad (6)$$

$$= s(t) + n_1(t) + G * a * n_1(t - \tau + \Phi) \quad (7)$$

The goal of the ANC 50 is to minimize the term $n_1(t) + G*a*n_1(t-\tau+\Phi)$. By minimizing the error vector magnitude for the desired signal s(t) at baseband, the ANC 50 desires a situation where:

$$G = \frac{-1}{a} \quad (8)$$

and $$\Phi = \tau \quad (9)$$

The advantage of this scheme is that once G and $\Phi$ are optimized in terms of the error vector magnitude, they do not need to adapt to any changes in the time domain characteristics of the interference. Because only two parameters are adapted (i.e. G and $\Phi$), it is easy for the ANC 50 to calculate the result using a Least Mean Squares (LMS) equalizer. Alternatively, the adaptation could easily be dealt with by Falconer's algorithm. However, the convergence of the equalizer must also ensure equalizer self-noise doesn't degrade the performance of the demodulator 52. In order for the noise cancellation scheme to work, the noise $n_2(t)$ must be highly correlated with $n_1(t)$, but it does not need to be known in advance.

In order to ensure optimal cancellation, the two paths (i.e, the received signal path and the noise cancellation path) should be identical as possible. Accordingly, identical BPF's 24, 16 and LNA's 18, 26 should be used. This will ensure that any effects of differential group delay between the desired channel and the interference channel will be minimized.

The noise reference signal from the near range interferer antenna 22 can be derived in various ways. A first method is to create a loop identical to the signal antenna 12 in terms of connectorization and cabeling, except that the loop would be terminated with a short circuit to ground. This method provides a conducted interference reference. Alternatively, H-field antennas could be used to sample the interference. Because the desired signal antenna 12 is an E-field antenna, an H-field antenna would offer rejection of the desired signal which is beneficial for the cancellation process.

Figure 4:
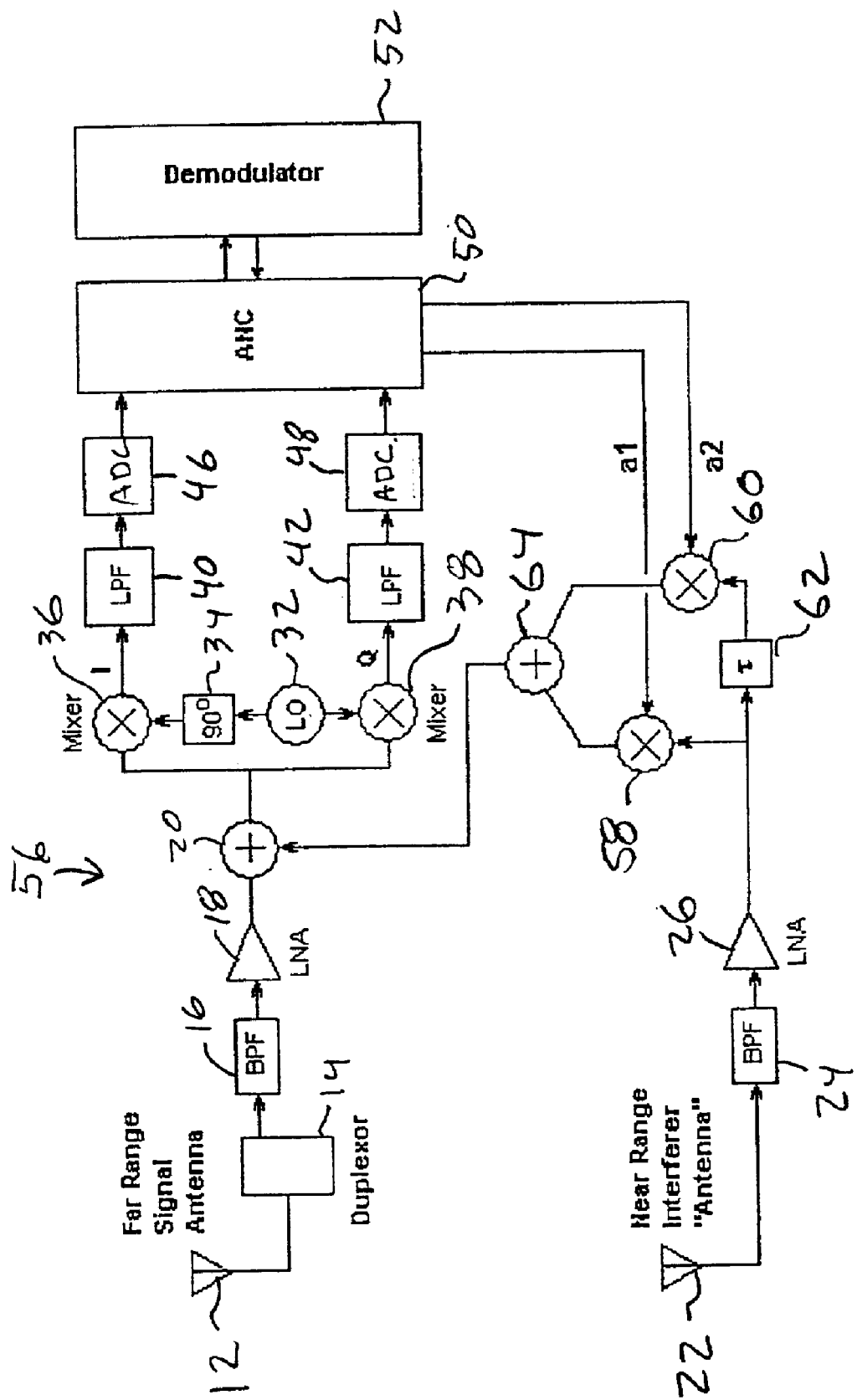
FIG. 4 is a block level diagram of a second embodiment of the noise cancelling receiver.

Referring to FIG. 4, the receiver 10 of FIG. 3 can be alternatively implemented using a delay line structure. For instance, in the case where the interference is a single sinusoid, the phase corrector 30 and gain corrector 28 can be reduced to a simple two-stage tapped delay line (TDL). The receiver 56 of FIG. 4 comprises an identical receiver portion as that shown in FIG. 3. However, the gain corrector 28 and the phase corrector 30 are replaced with delay lines. Specifically, the noise reference signal from interferer antenna 22 is fed through BPF 24 and LNA 26 before being inputted into mixer 58 that mixes the noise reference signal with coefficient a1. Similarly, the noise reference signal is phase shifted by $\tau$ in shifter 62 and then mixed with coefficient a2 by mixer 62. The scaled and phase shifted noise reference signals from the mixers 58 and 60 are then added together by adder 64 to generate the scaled and phase shifted replica of the interference. By appropriate scaling of the two coefficients a1 and a2, the gain and phase of the noise reference signal is adjusted to cancel the near field interference in the signal channel. The actual phase of the TDL output is governed by the ratio of a1/a2.

In the example shown in FIG. 4, $\tau$ must be greater than or equal to $1/\Delta f$, where $1/\Delta f$ is the bandwidth over which the ANC 50 is required to operate. The embodiment of the receiver 56 is ideally suited for single frequency interference and may also work for multiple carriers depending on their relative phases and amplitudes. Ideally, for multiple interfering carriers, a higher order TDL structure is required.

Figure 5:
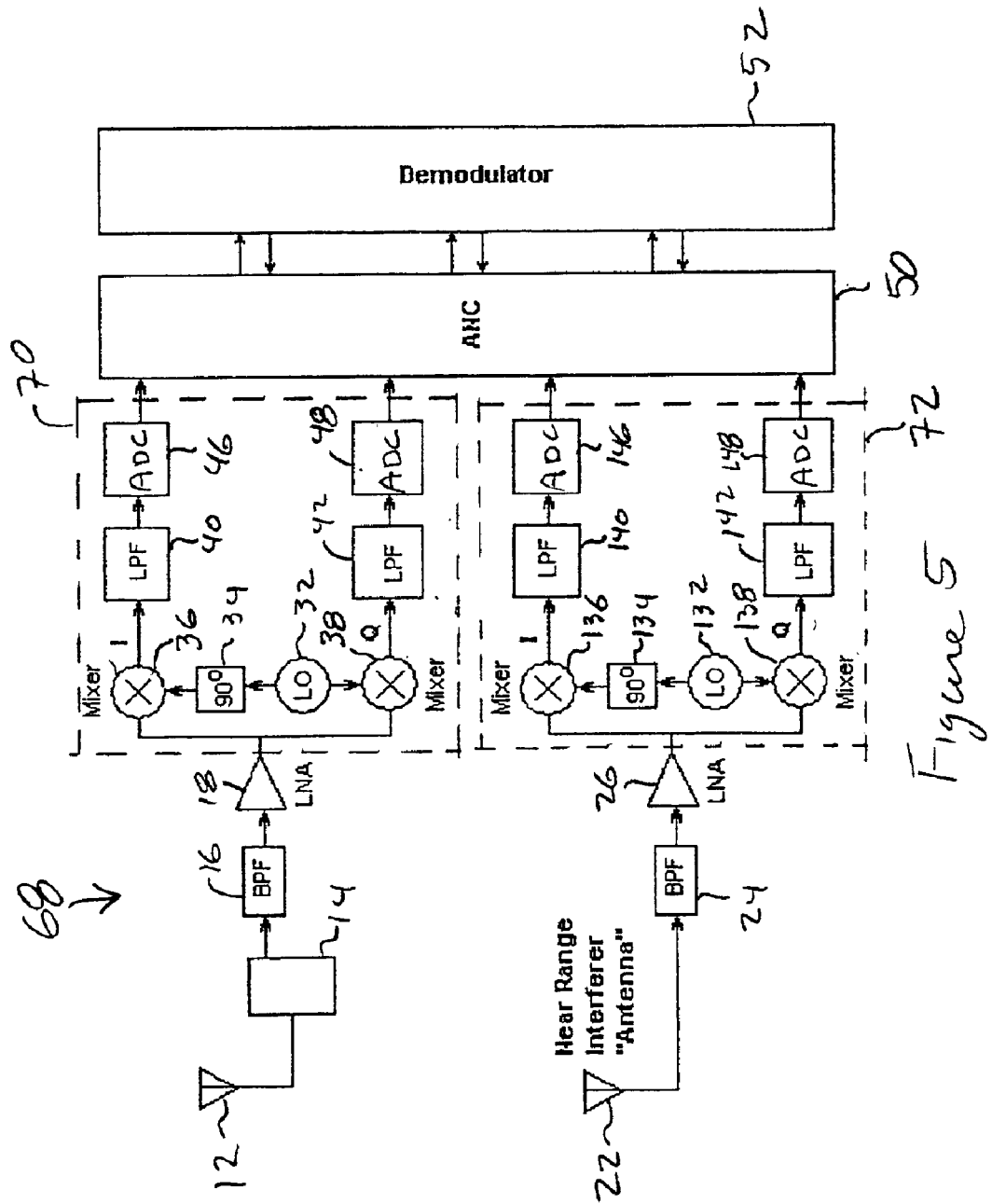
FIG. 5 is a block level diagram of a third embodiment of the noise cancelling receiver.

Referring to FIG. 5, a circuit 68 for adaptive cancellation at baseband using an independent RF interference channel is shown. The circuit 68 is similar to circuits 10 and 56, yet the I and Q channels for both the interference and the signal plus interference are available separately. The received signal is processed using converter 70, while the noise reference signal is processed using converter 72. The converters 70 and 72 are identical structures, as seen in FIG. 5.

Accordingly, the noise reference signal has an I path wherein the noise reference signal from the LNA 26 is mixed by a mixer 136 with a LO signal from LO 132 that has been phase shifted ninety degrees by LO shifter 134. After being mixed with the phase shifted LO signal, then the noise reference signal is passed through LPF 140 and DAC 146 and into ANC 50. Similarly, the noise reference signal from LNA 26 is mixed with the LO signal from LO 132 by mixer 138 in the Q path. The mixed noise reference signal is then passed through LPF 142 and DAC 148 before being inputted into ANC 50. The ANC 50 is able to separately process the noise reference signal in order to cancel the noise in the desired signal. Accordingly, the ANC 50 can add the noise cancel signal to the received signal in order to cancel noise.

Figure 6:
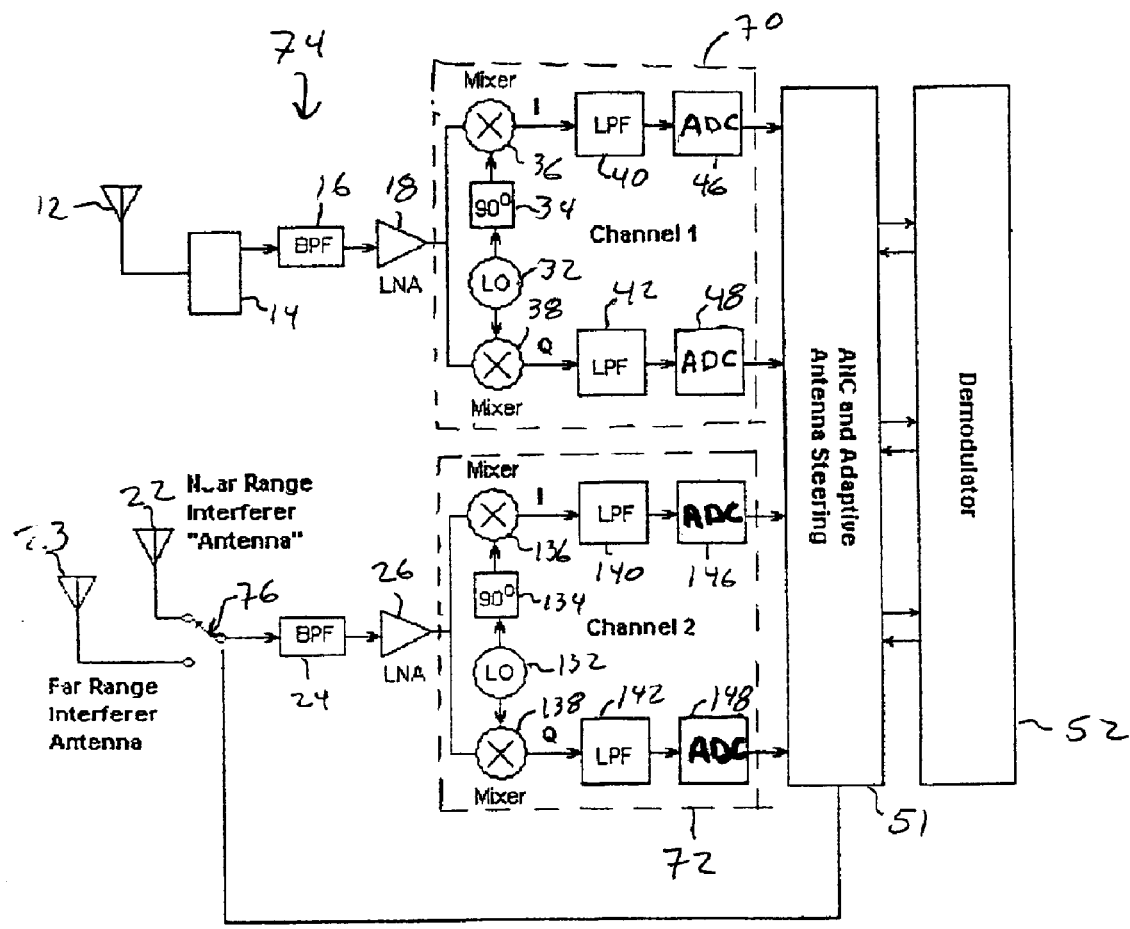
FIG. 6 is a block level diagram of a fourth embodiment of the noise cancelling receiver.

Referring to FIG. 6, an adaptive noise cancellation circuit 74 with beam forming is shown. As will be recognized by those of ordinary skill in the art, a phased array antenna can be used to direct a main antenna lobe towards a desired signal and/or direct antenna nulls toward far range interferers (i.e., other base stations or sources of interference in the far field). The phased array antenna system is formed by two or more antennas which are combined at complex baseband in such a way as to form an antenna pattern to minimize the effects of far field interference. However, the beamforming technique is only applicable to far field interferers because the received signal and near field noise is the same (or nearly the same) at each antenna and in the near field of the array.

However, by including an RF switch 76 that switches between the near range interferer antenna 22 and a far range interferer antenna 23 it is possible to reduce both far field and near field noise. Accordingly, the circuit 74 includes RF switch 76 which is operable to switch between the near range interferer antenna 22 which senses the near field reference signal and the far range interferer antenna 23 which senses the far field signal plus interference. Furthermore, the circuit 74 includes an ANC and adaptive steering module 51 which controls the switch 76 in order to choose which antenna 22 or 23 is to receive the noise reference signal. The ANC and adaptive antenna steering module 51 is similar to the ANC 50 but further includes the ability to choose and steer the antenna beam as desired. Accordingly, the ANC and adaptive antenna steering module 51 could implement either a phase array beam steering algorithm to minimize far field interference, or an adaptive noise canceling technique to minimize the near field interference, as previously described.

Figure 7:
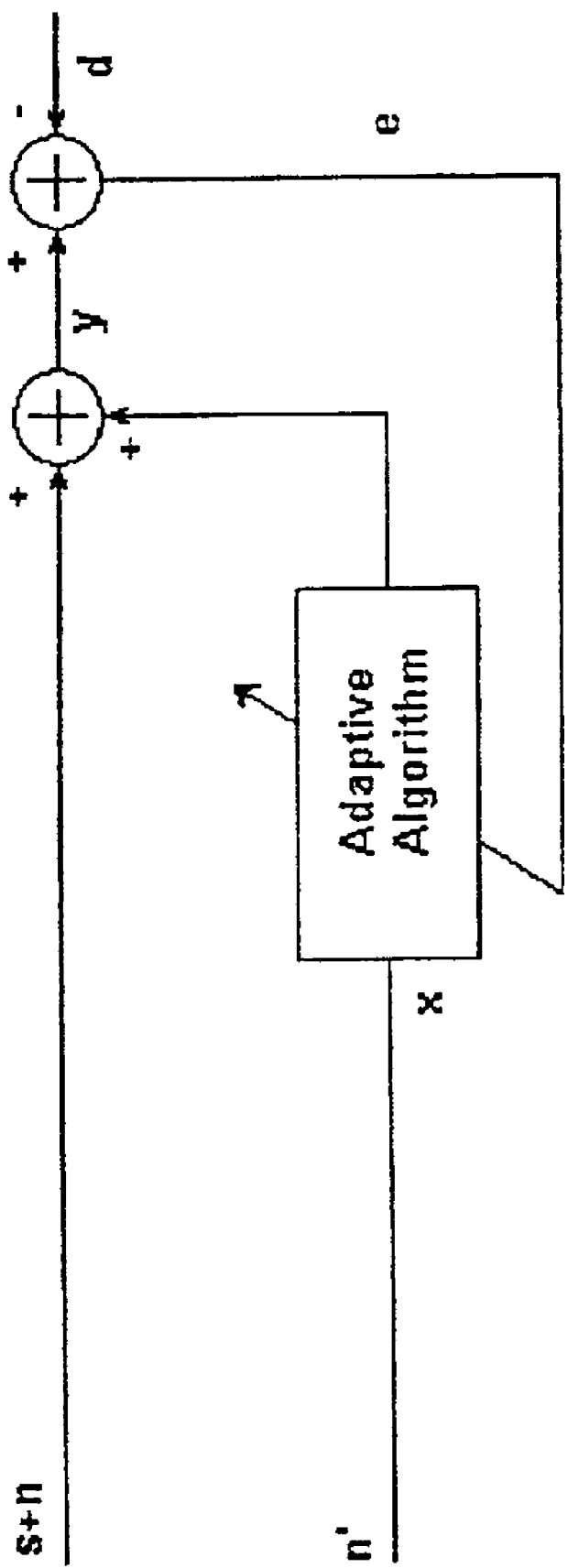
FIG. 7 is a block level diagram of an adaptive noise canceller.

As previously mentioned above, the ANC 50 uses a cancellation technique in order to generate the compensation signal that cancels noise in the desired signal. A general form of the ANC 50 is shown in FIG. 7. In general, the ANC 50 seeks to reduce the noise induced error in a signal such that a statistical criterion or cost function is optimized. The ANC 50 uses the error e(n) between the received signal and the desired signal in the derivation of the cost function. The desired signal s(k) is corrupted by some noise source n(k).

The two most common optimization techniques are:
(1) Minimum Mean Square Error—minimizes the expectation $E\{e^2(k)\}$ where E denotes the expectation operator, e(k)=d(k)−y(k) is the estimation error, d(k) is the desired response and y(k) is the actual filter output.
(2) Exponentially Weighted Least Squares Error—minimizes the sum $$\sum_{k=0}^{N-1} \lambda^{N-1-k} e^2(k) \quad (10)$$

where N is the total number of samples and λ denotes the exponential weighting factor whose value is close to 1.

As previously mentioned, the ANC 50 processes the noise reference in such a way as to minimize the cost function. In order for this cancellation to occur, there must be some degree of correlation between the noise reference signal and the noise which is degrading the signal. The most common form to realize the adaptive cancellation technique is the direct form even though other forms are available (i.e., cascade form, parallel form, and lattice form). A system block diagram for a direct form conventional FIR filter is shown in FIG. 8.

Figure 8:
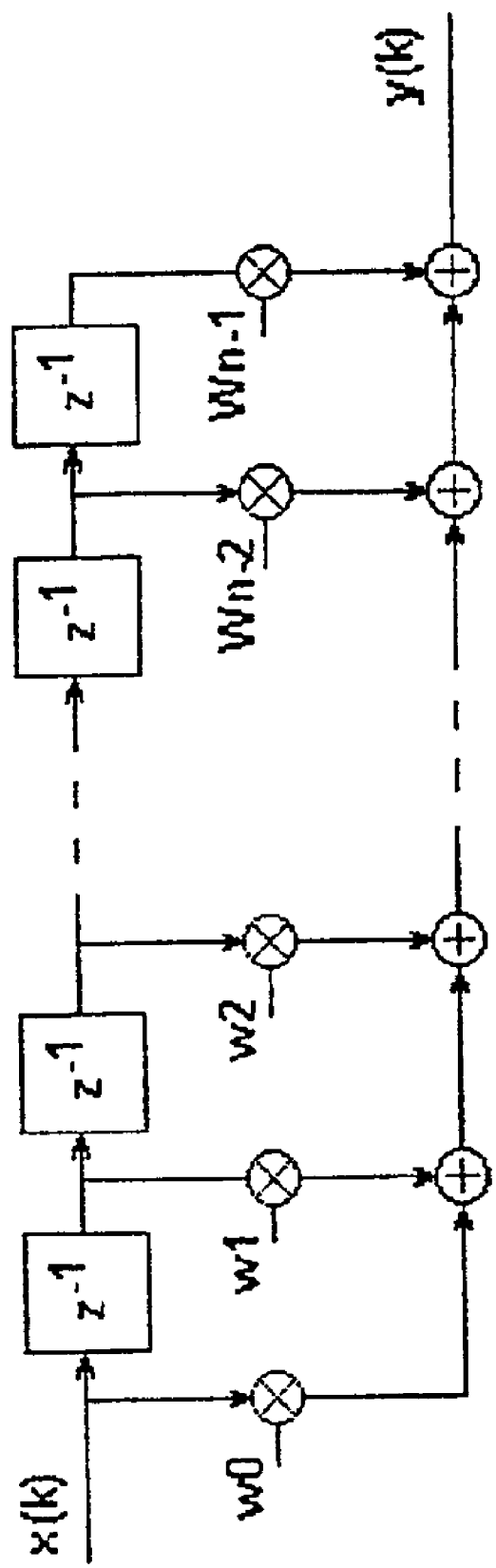
FIG. 8 is a block level diagram of a Finite Impulse Response (FIR) filter.

The output y(k) of the filter shown in FIG. 8 is given by:

$$y(k)=X^T(k)W(k) \quad (11)$$

where $X^T(k)$ is the buffered input signal in transposed vector form and W(k) is the filter tap weights in vector form. The error vector e(k) is the difference between the desired (reference) signal d(k) and the output y(k), and is given by:

$$e(k)=d(k)-y(k) \quad (12)$$

The filter taps update simply by:

$$W(k+1)=W(k)+u*g(k) \quad (13)$$

where $$g(k)=2e(k)*x(k) \quad (14)$$

In equation 14, g(k) is the key to the convergence because it represents the estimated gradient or the projection of the square of the current error signal 2e(k) on the filter tap weight. When the algorithm converges, g(k) is expected to be a very small number with zero mean value.

The step size u in Equation 13 must be in the range of 0<u, $1/L_{max}$ where $L_{max}$ is the largest Eigenvalue of the covariance matrix R. R is given by the equation:

$$R=E|X(k)^T X(k)| \quad (15)$$

In practice, u should be much smaller than $1/L_{max}$ when $L_{min}$ is much smaller than $L_{max}$. The number of steps it takes for the algorithm to converge is proportional to $L_{max}/L_{min}$.

Figure 9:
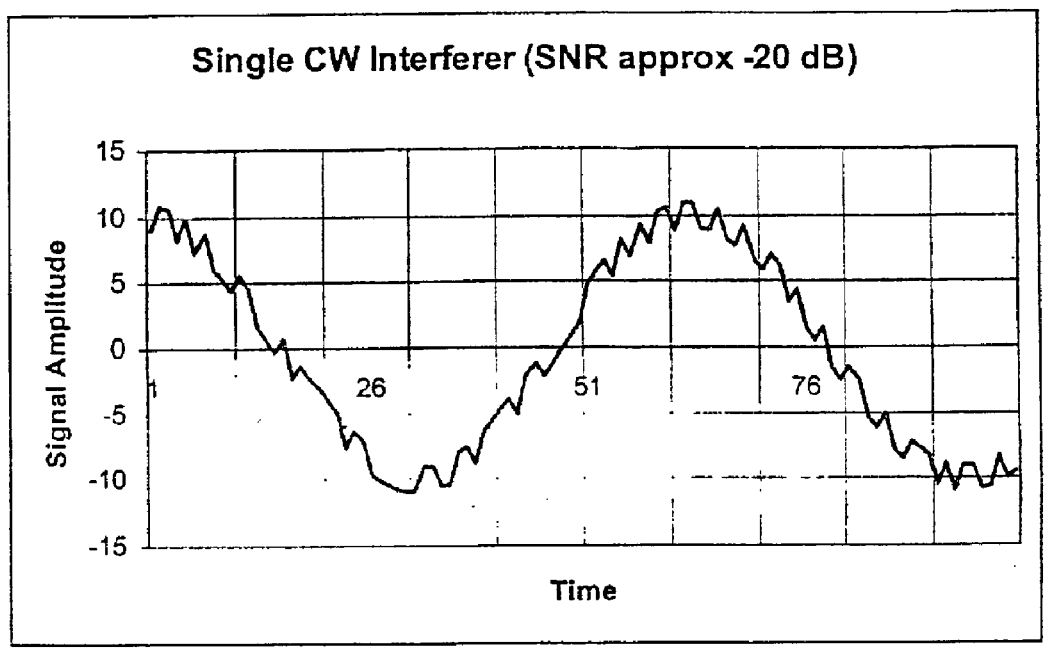
FIG. 9 is a waveform diagram for a single carrier wave (CW) interferer.
Figure 10:
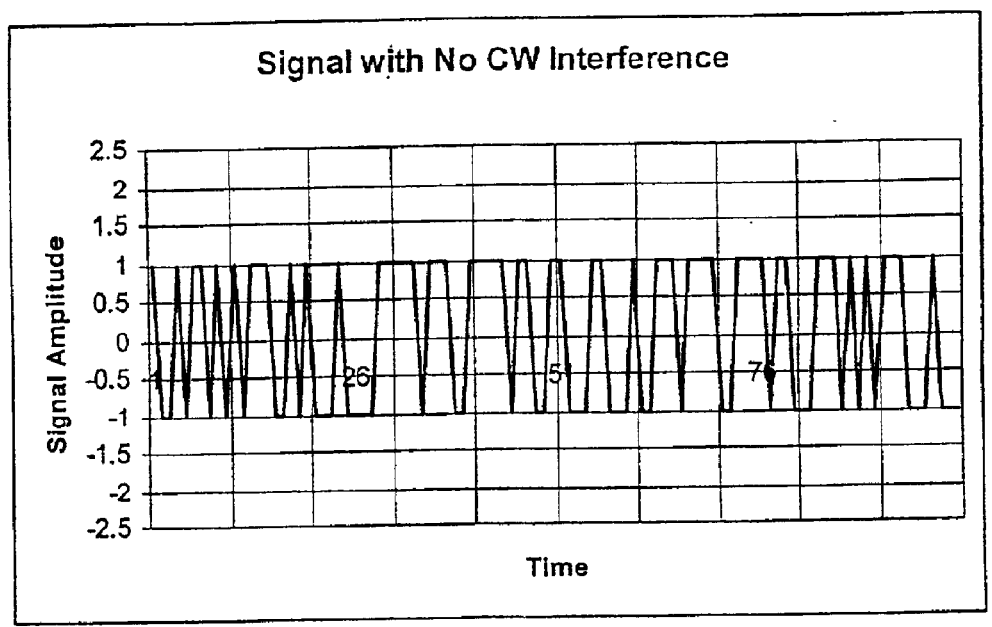
FIG. 10 is a waveform diagram for the signal in FIG. 9 without any interference.

An example of how the adaptive noise cancellation technique removes noise will now follow. A 5-tap FIR LMS equalizer was used to remove a single sine wave interferer from a signal source. A basic binary signaling scheme (i.e., Pulse Amplitude Modulation) was used as the desired signal. A single sine wave interferer with variable amplitude and variable noise was added to the baseband signal. The step coefficient was adjustable to allow the optimum value to be determined empirically. In the example, the uncorrupted baseband signal had values of +/−1 and the sine wave ranged in magnitude from −10 to +10. Accordingly, a signal to noise ratio (SNR) of approximately −20 dB was generated. Random noise with a RMS value of about 0.025 was also added to the signal. The uncorrupted sine wave was used as the noise interference reference signal. FIG. 9 shows a plot of the corrupted output. For comparison, FIG. 10 shows the data with no interference. The signal is sampled at the rate of one sample per symbol. As can be seen from a comparison of FIGS. 9 and 10, it appears exceedingly difficult to extract the data from the corrupted signal.

Figure 11:
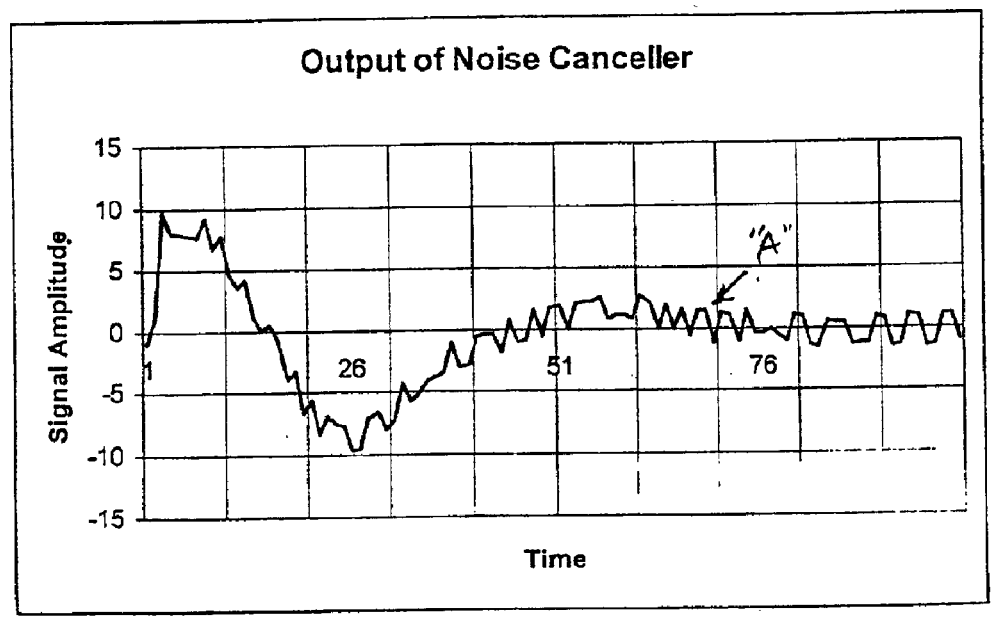
FIG. 11 is a waveform diagram showing the output of the adaptive noise canceller converging.
Figure 12:
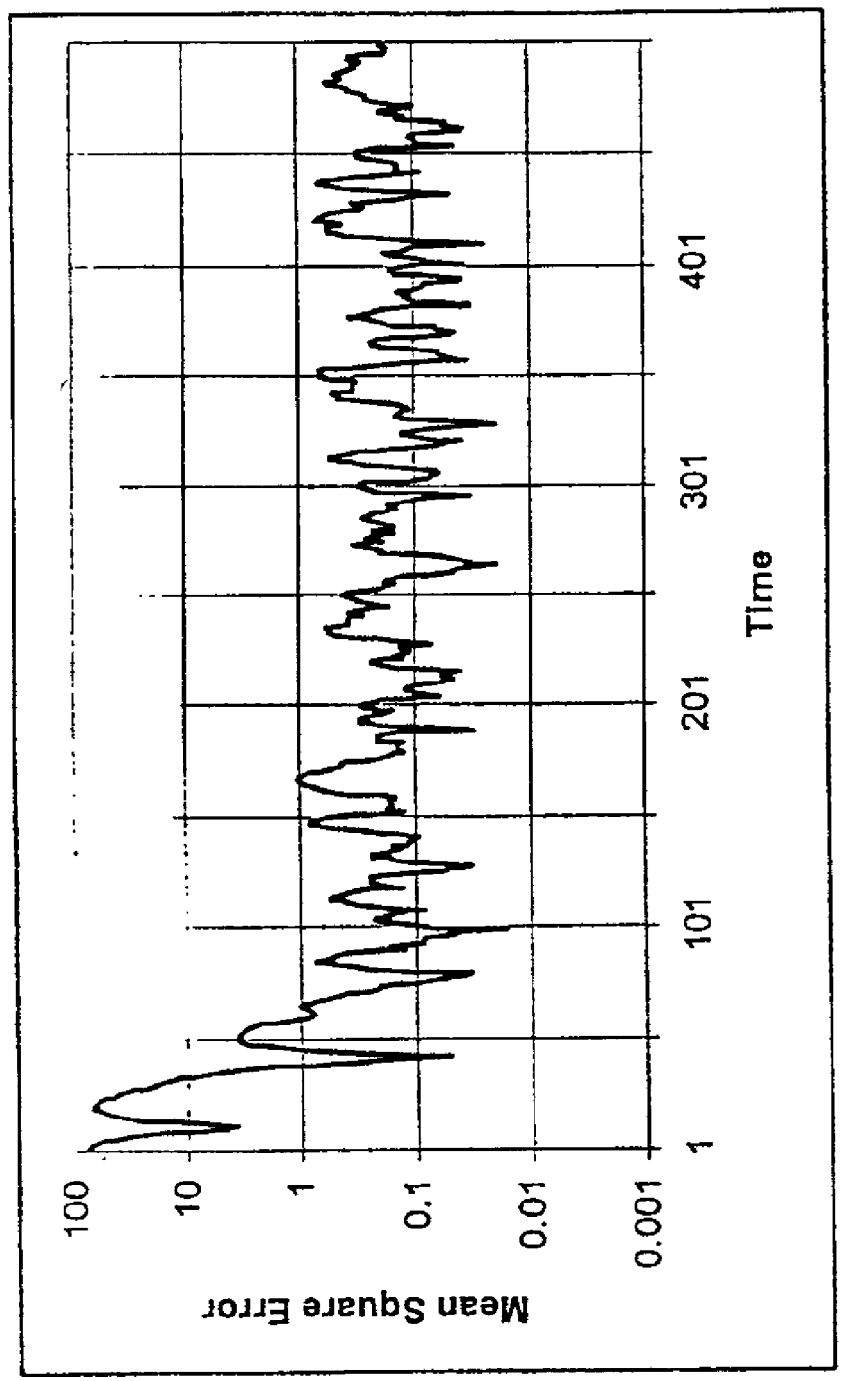
FIG. 12 is a waveform diagram showing the mean square error converging for the adaptive noise canceller.

When a simple LMS equalizer is applied to the baseband signal corrupted by a single CW interferer (FIG. 9), a considerable reduction in the interference results. FIG. 11 shows the output of the ANC 50 after applying the LMS equalizer. Initially, the noise is quite dominant, but after about 70 symbols (point "A"), the noise has almost been completely removed. Referring to FIG. 12, the convergence of the mean square error $e_k$ as the ANC 50 converges to the Minimum Mean Square Error (MMSE) condition is shown.

Figure 13:
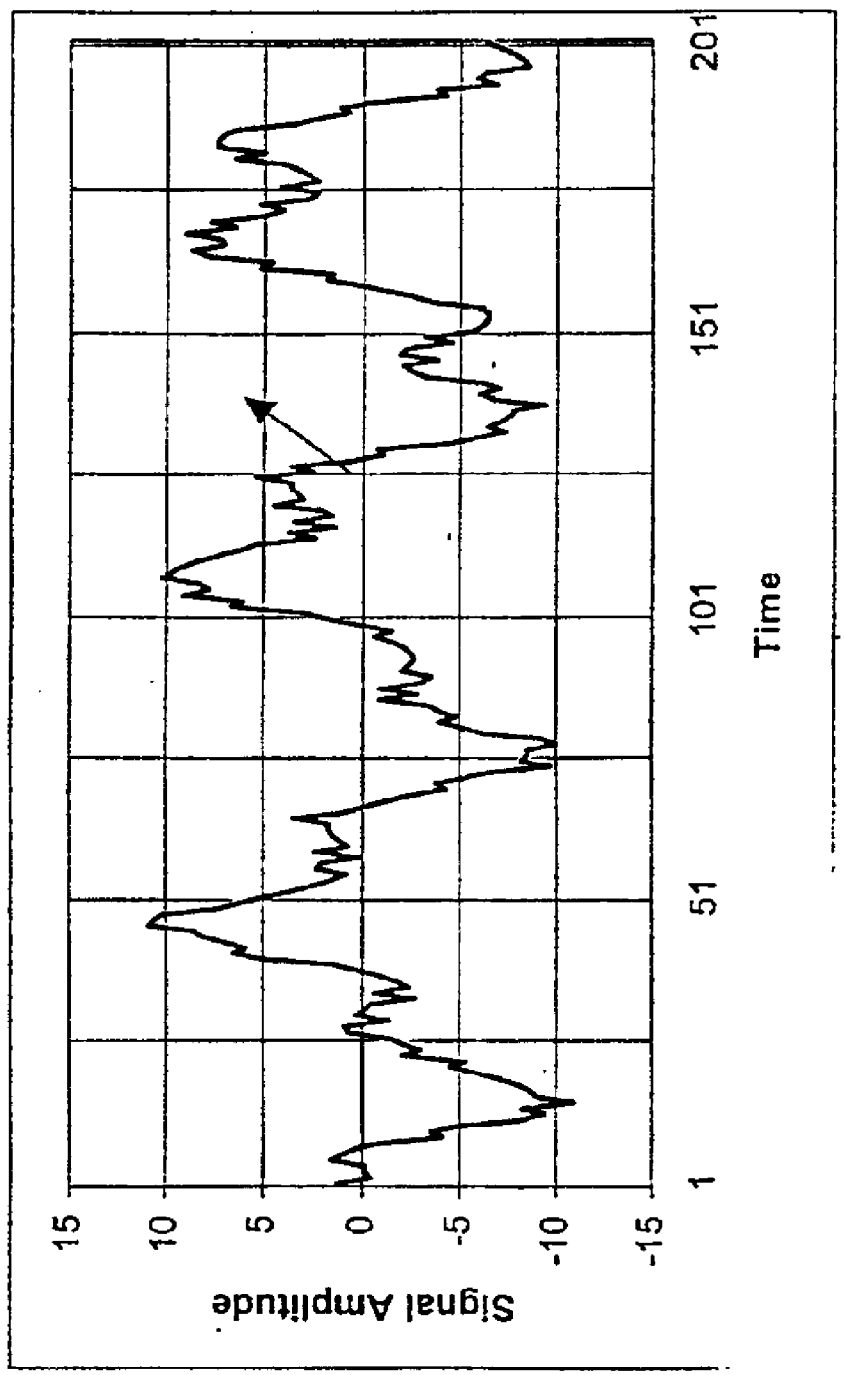
FIG. 13 is a waveform diagram showing a signal with multiple interferers.

An example of multiple CW interferers will now be discussed. For this example, the second interferer will have a magnitude of half that of the first interferer and a frequency of 3.1456 times the first interferer. The combined interference magnitude is limited to the range of −10 to +10. A plot of the corrupted baseband signal with multiple CW interferers prior to noise cancellation is shown in FIG. 13.

In the case of multiple interferers, considerable improvement is achieved after the application of the techniques used by the ANC 50. A plot of the mean square error is shown in FIG. 14 and represents the data set from the start of the cancellation technique until well into the convergence region.

Additionally, a time varying single CW interferer is shown in FIG. 15. In this example, the magnitude of the CW interferer was reduced in magnitude by 20% and the frequency was tripled at the $240^{th}$ symbol. This simulates the case where the near range interference characteristics change abruptly. FIG. 15 shows the plot of the mean square error versus time. As can be seen, the convergence from time t=1 onwards is typical of that shown for FIG. 11 such that it takes about 50 symbols for convergence to occur. However, at the $240^{th}$ symbol (point "B"), there is a large blip followed by a rapid convergence showing that a stable result is achieved.

Figure 16:
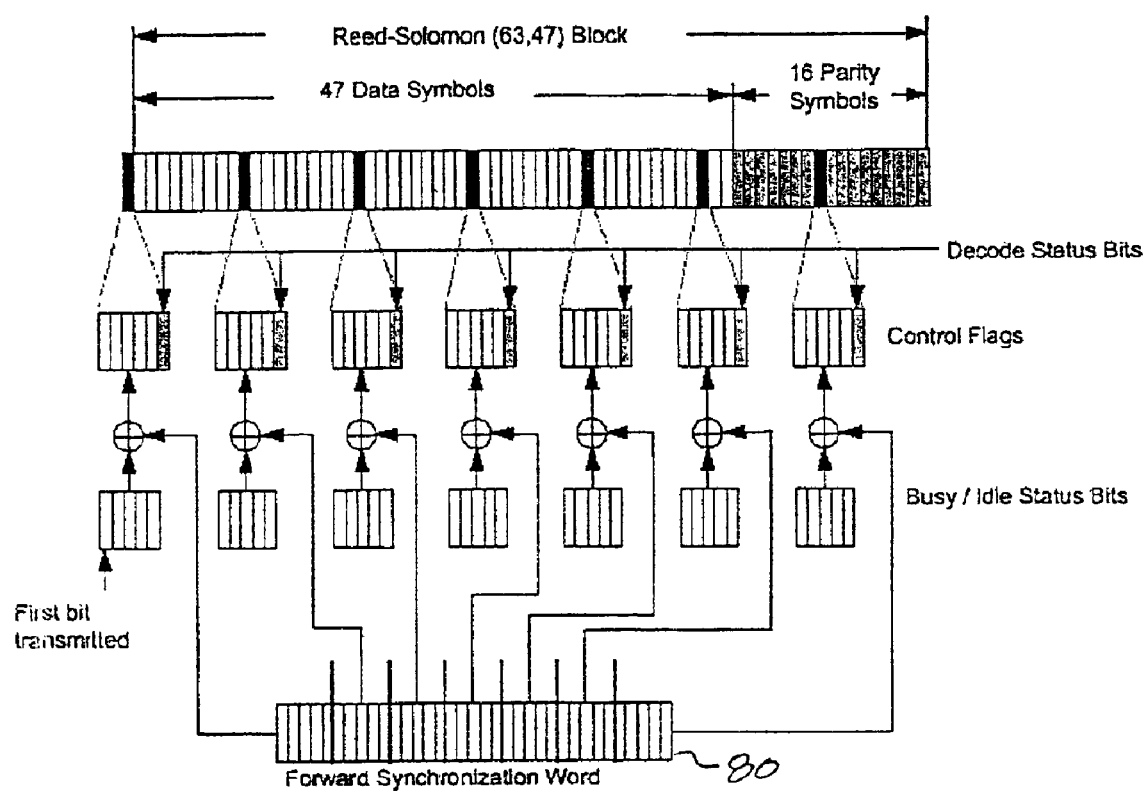
FIG. 16 is a bit diagram for a CDPD code showing a forward synchronization word.

In addition to the foregoing, it is also possible to use the adaptive noise cancellation technique of the present invention even though a noise reference signal is not available. In this instance it is possible to use data embedded in the received signal as a reference to aid in the noise cancellation process. Referring to FIG. 16, an example of the structure of a CDPD forward channel data stream is shown. Embedded in the data stream is a 35 bit binary synch word 80 that is interleaved as one 5 bit fragment every 60 bits. The ANC 50 can search for the 35 bit synch word 80 using commonly known correlation techniques. Once the synch word 80 is found, the ANC 50 can use the stored history for the 35 bits of the synch word 80 to determine the symbol error for these bits and adapt the TDL coefficients accordingly. The coefficients would remain frozen until the next occurrence of the synch word 80. As long as the noise is relatively stationary relative to the occurrence of the known synch word in the data stream, the TDL coefficients should be able to remain "frozen" until they can be updated on the next occurrence of the synch word 80 in the forward channel data stream.

Figure 17:
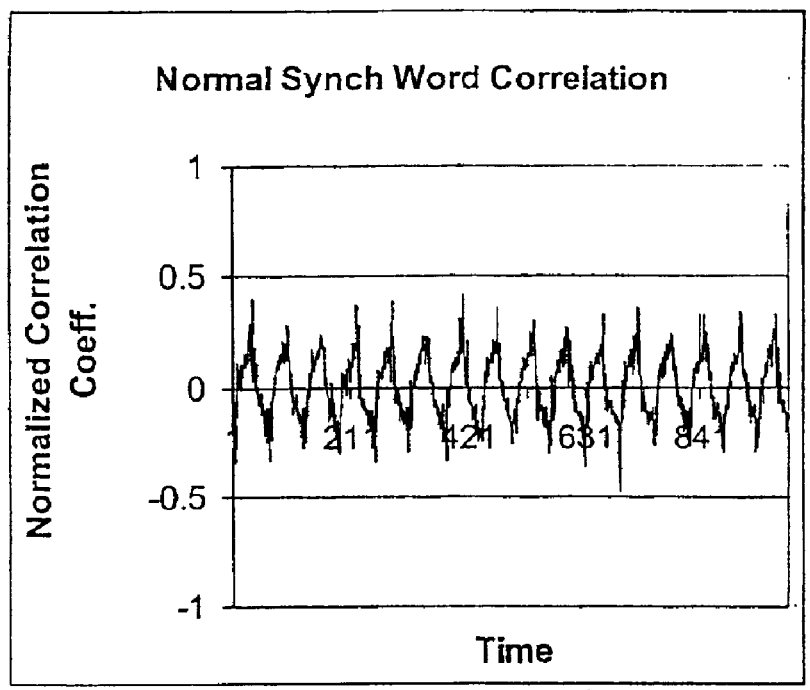
FIGS. 17 and 18 are waveform diagrams showing correlation of the forward synchronization word.

A difficulty arises by the effect of large interference on the correlation coefficient. Referring to FIG. 17, it can be seen that the interference destroys the correlation due to the extremely large interference magnitude relative to the signal being searched for by the correlator. However, it is possible to solve this by differentially decoding the 35 bit synch word 80.

Figure 18:
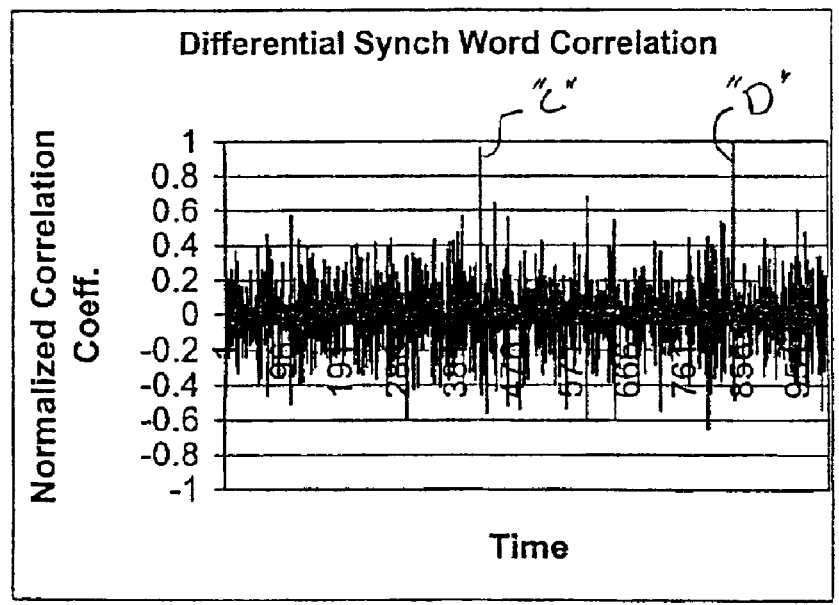

Specifically, the 35 bit synch word 80 consists of 7 groups of 5 bits which can be decoded differentially as 7 groups of 4 bits. The corrupted signal is differentially decoded and then cross correlated with a 28 bit reference function. The forward channel synch word 80 is not changed, but is treated as a differentially encoded codeword, and then differentially decoded and correlated with the differentially decoded version of the 35 bit synch word 80. The result is shown in FIG. 18 where the SNR is about 20 dB and the interferer is a single CW tone. The two synch correlations have values of very nearly 1 at locations "C" and "D" in spite of the extremely large interference. It is possible to use this technique up to values of SNR of about 30 dB and still obtain correlation values around 0.9.

Figure 19:
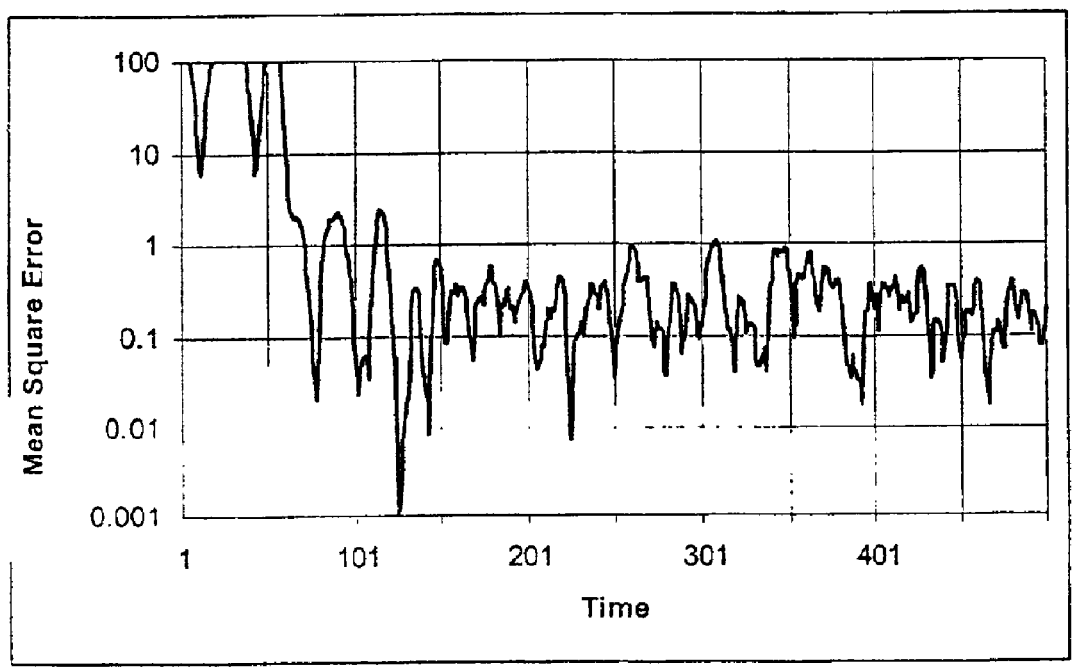
FIG. 19 is a waveform diagram showing the mean square error converging for the synchronization word.

As is evident, by utilizing the forward channel synch word it is possible to adapt the noise canceller rather than doing purely blind cancellation using estimates of the symbol decisions. Referring to FIG. 19, a simulation was performed where the correlation was used to find the location of the 35 bit CDPD forward channel synch word 80 using only the seven 5-bit components to adapt the filter tap coefficients. Essentially, during the 420 bits of the forward channel block, there were seven update intervals and only 5 bits were used in each interval for the calculation of tap weights. The tap weights remained frozen at the last updated values between intervals. The means square error as a function of time for a −20 dB SNR is shown in FIG. 19. The step value for the example in FIG. 19 was optimized to speed up the training time. It can be seen that the initial error during the acquisition phases was quite high, yet rapidly converged. After the second 5 bit synch word interval, it can be seen that very significant noise reduction occurred.

It will be recognized that although the above-described illustration used the CDPD forward channel as an example, similar a priori knowledge of a forward channel signaling scheme for other wireless protocols could be used in a similar fashion. Furthermore, even though the LMS technique is discussed for the previous examples, it will be recognized that other techniques exist. Accordingly, Recursive Least Squares and Kalman techniques that achieve much lower noise floors than the LMS technique can be used. However, these other techniques require considerably more computational power than the basic LMS algorithm.

Additional modifications and improvements of the present invention may be apparent to those of ordinary skill in the art. Thus, the particular combination of parts described and illustrated herein is intended to represent only certain embodiments of the present invention, and are not intended to serve as limitations of alternative devices within the spirit and scope of the invention.

What is claimed is:

1. A receiver with reduced near field noise, the receiver comprising:

a far range receiving section configured to sense a desired signal having near field noise;

a near range receiving section configured to sense a near field noise reference signal;

an adaptive noise canceller configured to detect the magnitude of an error vector from the far range receiving section by correlating the sensed desired signal from the far range receiving section with a known noise interference reference signal, and to adjust the phase and gain of the near field noise reference signal in response thereto in order to generate a corrected near field noise reference signal; and an adder configured to add the corrected near field noise reference signal to the desired signal in order to cancel the near field noise.

2. The receiver of claim 1 wherein the far range receiving section comprises:

a far range antenna configured to sense the desired signal and the near field noise;

a far range bandpass filter electrically connected to the far range antenna; and and a far range amplifier electrically connected to the far range bandpass filter;

wherein the far range antenna, the far range bandpass filter, and the far range amplifier are configured to sense the desired signal and the near filed noise.

3. The receiver of claim 1 wherein the near range receiving section comprises:
   a near range antenna configured to sense the near field noise reference signal;
   a near range bandpass filter electrically connected to the near range antenna; and
   a near range amplifier electrically connected to the near range bandpass filter;
   wherein the near range antenna, the near range bandpass filter, and the near range amplifier are configured to sense the near field noise reference signal.

4. The receiver of claim 1 wherein:
   the far range receiving section comprises:
      a far range antenna configured to sense the desired signal and the near field noise;
      a far range bandpass filter electrically connected to the far range antenna; and
   a far range amplifier electrically connected to the far range bandpass filter;
   wherein the far range antenna, the far range bandpass filter and the range amplifier are configured to sense the desired signal and the near field noise; and the near range receiving section comprises:
   a near range antenna configured to sense the near field noise reference signal;
   a near range bandpass filter electrically connected to the near range antenna; and
   a near range amplifier electrically connected to the near range bandpass filter;
   wherein the near range antenna, the near range bandpass filter and the near range amplifier are configured to sense the near field noise reference signal.

5. The receiver of claim 1 further comprising:
   a phase corrector electrically connected to the adaptive noise canceller and configured to correct the phase of the near field noise reference signal; and
   a gain corrector electrically connected to the adaptive noise canceller and configured to correct the gain of the near field noise reference.

6. The receiver of claim 1 further comprising a demodulator electrically connected to the adaptive noise canceller and configured to demodulate the desired signal.

7. The receiver of claim 1 further comprising at least one digital to analog converter electrically connected to the adder and the adaptive noise canceller and configured to generate a digital representation of the desired signal.

8. The receiver of claim 7 further comprising at least one mixer electrically connected to the adder and the digital to analog converter and configured to mix the desired signal with a local oscillator signal.

9. The receiver of claim 8 further comprising a local oscillator electrically connected to the mixer and configured to generate the local oscillator signal.

10. The receiver of claim 9 further comprising at least one low pass filter electrically connected to the mixer and the digital to analog converter.

11. The receiver of claim 1 further comprising an in-phase signal path and a quadrature phase signal path from the mixer to the adaptive noise canceller.

12. The receiver of claim 1 wherein the adaptive noise canceller uses a Least Mean Squares technique to adjust the phase and gain of the near field noise signal.

13. A receiver having reduced near held noise, the receiver comprising;
   a far range receiving section configured to sense a desired signal having near field noise;
   a near range receiving section configured to sense a near field noise reference signal;
   an adaptive noise canceller electrically connected to the far range receiving section and configured to detect the magnitude of an error vector from the far range receiving section by correlating the sensed desired signal from the far range receiving section with a known noise interference reference signal, and to generate a phase compensation coefficient signal and a gain compensation coefficient signal therefrom;
   a tap delay line electrically connected to the adaptive noise canceller and the near range receiving section, the tap delay line configured to adjust the phase and gain of the near field noise reference signal in response to the phase compensation coefficient signal and the gain compensation coefficient signal in order to generate a corrected near field noise reference signal; and
   an adder electrically connected, to the tap delay line and the far range receiver, the adder configured to add the corrected near field noise reference signal to the desired signal in order to cancel the near field noise.

14. The noise canceling receiver of claim 13 wherein the tap delay line comprises:
   a phase mixer configured to mix the near field noise reference signal with the phase compensation coefficient signal in order to generate a phase compensated near field noise reference signal;
   a gain mixer configured to mix the near field noise reference signal with the gain compensation coefficient signal in order to generate a gain compensated near field noise reference signal; and
   an adder operative to add the phase compensated near field noise reference signal and the gain compensated near field noise reference signal to generate the corrected near field noise reference signal.

15. The receiver of claim 14 wherein the adaptive noise canceller uses a Least compensation coefficient signal.

16. The receiver of claim 14 wherein:
   the far range receiving section comprises:
      a far range antenna configured to sense the desired signal and the near field noise;
      a far range bandpass filter electrically connected to the far range antenna; and
   a far range amplifier electrically connected to the far range bandpass filter;
   wherein the far range antenna, the far range bandpass filter and the far range amplifier are configured to sense the desired signal and the near field noise; and
   the rear range receiving section comprises:
   a near range antenna configured to sense the near field noise reference signal;
   a near range bandpass filter electrically connected to the near range antenna; and
   a near range amplifier electrically connected to the near range bandpass filter;
   wherein the near range antenna, the near range bandpass filter, and the near range amplifier are configured to sense the near field noise reference signal.

17. A noise canceling receiver comprising:
   far range receiving means configured to sense a desired signal having near field noise;
   near range receiving means configured to sense a near field noise reference signal;
   noise canceling means configured to detect the magnitude of an error vector from the far range receiving means by correlating the sensed desired signal from the far range receiving means with a known noise interference reference signal, and to adjust the phase and magnitude of the near field noise reference signal in response thereto such that the noise canceling means generates a corrected near field noise reference signal; and addition means electrically connected to the noise canceling means and the far range receiving means, the addition means configured to add the corrected near field noise reference signal to the desired signal and in order to cancel the near field noise.

18. A method for reducing near field noise in a desired signal, the method comprising the steps of:
   (a) sensing the desired signal having near field noise with a far range receiving section;
   (b) sensing a near field noise reference signal with a near range receiving section;
   c) generating a compensation signal with an adaptive noise canceller that detects the magnitude of an error vector from the far range receiving section by correlating the sensed desired signal from the far range receiving section with a known noise interference reference signal;
   d) adjusting the phase and gain of the near field noise reference signal with the compensation signal in order to generate a corrected near field noise reference signal; and
   e) adding the corrected near field noise reference signal to the desired signal in order to cancel the near field noise.

19. The method of claim 18 wherein step (c) comprises generating the compensation signal using a Least Mean Squares technique.

20. The method of claim 18 wherein step (a) comprises sensing the desired signal having the near field noise with a far range receiving section that has a far range antenna, a fir range bandpass filter, and a far range amplifier.

21. The method of claim 18 wherein step (b) comprises sensing the near field noise reference signal with a near range receiving section having a near range antenna, a near range bandpass filter, and a near range amplifier.

22. The method of claim 18 wherein step (d) comprises adjusting the phase of the near field noise reference signal with a phase corrector, and adjusting the gain of the near field noise reference signal with a gain corrector in response to the compensation signal.

23. The method of claim 18 wherein step (d) comprises adjusting the phase and gain of the near filed noise reference signal with a tap delay line.

24. The method of claim 23 wherein in step (c) the compensation signal contains coefficients far the tap delay line.

25. A system for reducing near field noise in a desired signal, the system comprising:
   means for sensing the desired signal having near field noise;
   means for sensing a near field noise reference signal;
   means for generating a noise canceling signal by detecting the magnitude of an error vector from the means for sensing the desired signal by correlating the sensed desired signal with a known noise interference reference signal in order to generate a compensation signal;
   means for adjusting the phase and gain of the near field noise reference signal in response to the compensation signal in order to generate a corrected near field noise reference signal; and
   means for adding the near field noise reference signal to the desired signal in order to cancel the near field noise.

26. A system for generating a desired signal with reduced near field noise, the system comprising:
   a far range antenna configured to sense the desired signal having near field noise;
   a far range bandpass filter electrically connected antenna and configured to pass the frequency of the desired signal;
   a far range amplifier electrically connected to the bandpass filter and configured to amplify the desired signal;
   an in-phase path electrically connected to the far range amplifier and configured to mix the desired signal with a local oscillator signal and to convert the desired signal into a digital representation;
   a quadrature phase path electrically connected to the far range amplifier and configured to mix the desired signal with the local oscillator signal and to convert the desired signal into a digital representation;
   an adaptive noise canceller electrically connected to the in-phase path and the quadrature phase path, the adaptive noise canceller configured to detect the magnitude of an error vector from the in-phase path and the quadrature phase path and generate a compensation signal therefrom by correlating the sensed desired signal with a known noise interference reference signal;
   a near range interferer antenna configured to sense a near field noise reference signal;
   a near range bandpass filter electrically connected to the far range interferer antenna and configured to pass the frequency of the near field noise reference signal;
   a near range amplifier electrically connected to the near range bandpass filter and configured to amplify the near filed noise reference signal;
   a gain corrector electrically connected to the far range amplifier and the adaptive noise canceller, the gain corrector configured to adjust the gain of the near field noise reference signal in response to the noise compensation signal;
   a phase corrector electrically connected to the gain corrector and the canceller, the phase corrector configured to adjust the phase ear field noise reference of the near field noise reference signal in response to the compensation generate a corrected near field noise reference signal; and
   an adder electrically connected to the phase corrector, the in-phase path, and the quadrature phase path, the adder configured to add the corrected near field noise signal to the desired signal in order to reduce the of the near field noise.

27. A receiver having reduced near held noise, the receiver comprising;
   a far range receiving section configured to sense a desired signal having near field noise;
   a near range receiving section configured to sense a near field noise reference signal;
   an adaptive noise canceller electrically connected to the far range receiving section and configured to detect the magnitude of an error vector from the far range receiving section and generate a phase compensation coefficient signal and a gain compensation coefficient signal therefrom;
   a tap delay line electrically connected to the adaptive noise canceller and the near range receiving section, the tap delay line configured to adjust the phase and gain of the near field noise reference signal in response to the phase compensation coefficient signal and the gain compensation coefficient signal in order to generate a corrected near field noise reference signal; and an adder electrically connected, to the tap delay line and the far range receiver, the adder configured to add the corrected near field noise reference signal to the desired signal in order to cancel the near field noise wherein the tap delay line comprises:

a phase mixer configured to mix the near field noise reference signal with the phase compensation coefficient signal in order to generate a phase compensated near field noise reference signal;

a gain mixer configured to mix the near field noise reference signal with the gain compensation coefficient signal in order to generate a gain compensated near field noise reference signal; and an adder operative to add the phase compensated near field noise reference signal and the gain compensated near field noise reference signal to generate the corrected near field noise reference signal.

28. The receiver of claim 27 wherein the adaptive noise canceller uses a Least compensation coefficient signal.

29. The receiver of claim 27 wherein:

the far range receiving section comprises:

a far range antenna configured to sense the desired signal and the near field noise;

a far range bandpass filter electrically connected to the far range antenna; and a far range amplifier electrically connected to the far range bandpass filter;

wherein the far range antenna, the far range bandpass filter and the far range amplifier are configured to sense the desired signal and the near field noise; and the rear range receiving section comprises:

a near range antenna configured to sense the near field noise reference signal;

a near range bandpass filter electrically connected to the near range antenna; and a near range amplifier electrically connected to the near range bandpass filter;

wherein the near range antenna, the near range bandpass filter, and the near range amplifier are configured to sense the near field noise reference signal.

* * * * *